US006336174B1

(12) United States Patent
Li et al.

(10) Patent No.: US 6,336,174 B1
(45) Date of Patent: Jan. 1, 2002

(54) HARDWARE ASSISTED MEMORY BACKUP SYSTEM AND METHOD

(75) Inventors: Qiang Li, Campbell; Clifford E. Strang, Jr.; Jon F. Zahornacky, both of San Jose, all of CA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/370,855

(22) Filed: Aug. 9, 1999

(51) Int. Cl.$^7$ ................................................ G06F 12/00
(52) U.S. Cl. ......................... 711/162; 711/161; 714/6; 365/228
(58) Field of Search ................................. 711/162, 160, 711/161; 714/6–22; 710/10; 713/340; 370/537; 365/228, 229

(56) References Cited

U.S. PATENT DOCUMENTS

| | | | | | |
|---|---|---|---|---|---|
| 4,072,852 | A | * | 2/1978 | Hogan et al. | 714/15 |
| 4,815,074 | A | * | 3/1989 | Jacobsen | 370/537 |
| 4,959,774 | A | * | 9/1990 | Davis | 714/6 |
| 5,283,792 | A | * | 2/1994 | Davies, Jr. et al. | 714/22 |
| 5,379,431 | A | * | 1/1995 | Lemon et al. | 710/10 |
| 5,799,200 | A | * | 8/1998 | Brant et al. | 713/340 |

OTHER PUBLICATIONS nvSRAM Basics, Simtek 1999 Data Book, Chapter 8, pp. 8–1 to 8–5.

* cited by examiner

Primary Examiner—Do Hyun Yoo
Assistant Examiner—Nasser Moazzami
(74) Attorney, Agent, or Firm—David M. Sigmond

(57) ABSTRACT

A hardware assisted memory module (HAMM) is coupled to a conventional computer system. During normal operation of the computer system, the HAMM behaves like a conventional memory module. The HAMM, however, detects and responds to at least one of the following trigger events: 1) power failure, 2) operating system hang-up, or 3) unexpected system reset. Upon detection of a trigger event, the HAMM electronically isolates itself from the host computer system before copying digital information from volatile memory to nonvolatile memory. Once isolated, the HAMM takes its power from an auxiliary power supply. The HAMM can be configured to copy all or part of the digital information to nonvolatile memory. Upon either a request or at power-up, the HAMM copies the digital information from the nonvolatile memory into the volatile memory. If there is a normal computer shutdown, the operating system will first warn the HAMM before shutting down, thus precluding it from performing a backup operation. The operating system determines whether the last shutdown was unexpected by reading a register stored in a reserved area of memory. If the operating system wants the digital information restored, it orders the HAMM to restore the backed-up digital information from nonvolatile memory to volatile memory.

80 Claims, 5 Drawing Sheets

HARDWARE ASSISTED MEMORY BACKUP SYSTEM AND METHOD

FIELD OF THE INVENTION

The invention relates to memory backup and restoration of digital information, and more particularly, to a hardware assisted memory backup system and method using nonvolatile memory.

BACKGROUND OF THE INVENTION

The need for emerging file server technology with multi-protocol file system semantics has created unique problems in data management for file service operations, such as saving data to disk storage in real-time and reliably. These problems are further exacerbated by the potential of catastrophic system failures, such as operating system (O/S) hang-up, and/or unexpected power failures and system resets. For some applications, the loss of certain types of data may not pose any serious problems. For client/server applications, however, if the system loses "meta" data, i.e., information concerning a system's file structure, the file structure will be difficult, if not impossible, to reconstruct.

In a typical client/server application, a client computer can request a server computer to store file system data to a permanent storage device, such as a hard disk. Because a typical write transaction can take several operations to complete, the client data is temporarily stored in server memory until the write transaction is successfully completed. Once the data is safely stored to disk, the server computer can inform the client computer that the write transaction was completed. This entire store transaction can take as long as 20 milliseconds, which is a long delay for the client.

Unfortunately, if a catastrophic event occurs while all or some of the data is still in system memory, data loss can occur. Data loss occurs because the server system memory typically is volatile memory, such as Dynamic Random Access Memory (DRAM) or Static Random Access Memory (SRAM). For example, DRAM employs a system of transistors and capacitors to retain data. Because the capacitors cannot maintain an electrical charge indefinitely, the capacitors must be continuously refreshed by a power supply. Thus, backing-up data stored in DRAM in the event of a power failure presents the additional problem of refreshing DRAM until all data has been safely transferred to nonvolatile memory.

Some conventional systems automatically transfer data from volatile memory (e.g., SRAM) to nonvolatile memory (e.g., Electrical Erasable Programmable Read-only Memory (EEPROM)), if the chip power drops below a first predetermined voltage (e.g., 4.2 volts from 5 volts). If the chip power drops below the first predetermined voltage, a store operation is started that continues until the chip power drops below a second predetermined voltage (e.g., 3.5 volts), after which time the integrity of the data being transferred from volatile memory becomes uncertain. Thus, the store operation must complete before the chip power drops below the second predetermined voltage.

The conventional systems described above provide a solution for systems requiring a limited amount of data transfer, such as 32K. Unfortunately, the amount of data that can be safely transferred by these systems is limited by the finite interval of time where the chip power is sufficiently high to ensure a successful data transfer. Unfortunately, for systems requiring a larger data transfer, such as 8 Mb or more, these conventional systems do not provide a solution.

Moreover, these systems typically cannot operate with DRAM because they do not provide a refresh engine that can operate during power failure events. As discussed above, a refresh engine, or its equivalent, is necessary in DRAM based systems to maintain data stored in volatile memory while such data is being backed-up to nonvolatile memory.

An additional problem with some conventional systems is their inability to provide memory backup in response to events other than power failure events, such as unexpected system resets or O/S hang-up. The conventional systems are unable to differentiate between normal system shutdowns and unexpected system shutdowns initiated by, for example, a user pressing a hardware reset button. The inability to differentiate between normal and unexpected system shutdowns can decrease the life of the nonvolatile memory employed in such systems because of the finite number of write cycles available in such memories. The ability to prolong the "write" life of nonvolatile memory is important when one considers that a typical EEPROM cell or flash memory cell can break down after a finite number of write cycles.

Still another problem with conventional systems and methods is how such systems and methods store O/S kernel code for rebooting the system after a catastrophic failure. In conventional embedded systems, O/S kernel code is usually stored in specialized nonvolatile memory, which requires additional memory mapping, and modification of BIOS to load and initialize the kernel. Storing O/S kernel code in specialized nonvolatile memory typically increases the number of system components, increases BIOS development and maintenance efforts, and reduces system boot speed.

Accordingly, there remains a need for a memory backup system and method that copies digital information from volatile memory to nonvolatile memory in response to catastrophic events, such as O/S hang-up and unexpected power failures and system resets. The system and method should be able to quickly copy a relatively large amount of information (e.g., 8 Mb or greater) from volatile memory (e.g., DRAM) to nonvolatile memory without corrupting the integrity of the information. Moreover, the system and method should be able to differentiate between normal system shutdown events and unexpected shutdown events to preserve the "write" life of the nonvolatile memory. The system and method should also use conventional memory chip formats and packaging, such as Dual In-line Memory Module (DIMM) or Single In-line Memory Module (SIMM). These conventional package formats can enable the system to easily couple with the system memory bus of a conventional computer system, such as a Personal Computer (PC).

Additionally, there is a need for storing O/S kernel code into main system memory to reduce the number of system components, reduce BIOS development and maintenance efforts, and improve system boot speed.

SUMMARY OF THE INVENTION

The present invention is directed to a hardware assisted memory module (HAMM) for communicating digital information between volatile and nonvolatile memory in response to a trigger event from, for example, a host computer system. The HAMM generally includes a volatile memory coupled to an information source for receiving and storing information; a nonvolatile memory coupled to the volatile memory for receiving and storing information communicated from the volatile memory; and a controller coupled to the memories for controlling the communication of information between the memories in response to the trigger event. The controller can determine the type of the trigger event from, for example, control information stored in the volatile memory.

In a preferred embodiment of the present invention, the HAMM is coupled to a host computer system, such as a PC. During normal operation of the computer system, the HAMM behaves like a conventional memory module, for example, storing digital information received from a data bus. The HAMM, however, detects and responds with a memory backup operation to at least one of the following events: 1) unexpected power failure, 2) operating system hang-up, or 3) unexpected system reset. Upon detection of an event, the HAMM electronically isolates itself from the host computer system before copying the digital information from volatile memory to nonvolatile memory. Once isolated the HAMM takes its power from an auxiliary power supply, such as a battery.

The HAMM can be configured to copy all or part of the digital information to nonvolatile memory. Upon either a request or at power-up, the HAMM copies the digital information from nonvolatile memory into volatile memory. If there is a normal or expected computer shutdown, the O/S warns the HAMM before shutting down the host computer system, thereby precluding the HAMM from performing the memory backup operation. The O/S determines whether the previous shutdown, if any, was unexpected by reading a control register in a reserved area of volatile memory, preferably outside the memory map of the volatile memory. If the O/S wants the file information restored, it orders the HAMM to restore the backed-up file information from nonvolatile memory to volatile memory.

The present invention is also directed to a memory backup system. The system is coupled to a host computer system for providing memory backup in response to a trigger event. The system includes a volatile memory coupled to an information source for receiving and storing information; a nonvolatile memory coupled to the volatile memory for receiving and storing information communicated from the volatile memory; and a controller coupled to the memories for controlling the communication of information between the memories in response to the trigger event. The controller determines the type of the trigger event from control information stored in the volatile memory.

The present invention is also directed to a memory backup method. The method includes the steps of: detecting a trigger event from a host computer system; determining if the trigger event is an unexpected host computer system failure or a normal host computer system shutdown by examining a data structure in volatile memory; copying digital information from volatile memory to nonvolatile memory only if the type of the trigger event is an unexpected host computer system failure; and storing control information relating to the type of the trigger event in volatile memory.

An advantage of the present invention can be best realized in a client/server application, where memory access time is reduced during write transactions. Because the HAMM provides assurance that data will be backed-up in the event of a catastrophic failure, a file server system can complete a transaction with a client even though all or part of the data to be transferred is still in volatile memory in the file server system. By completing the write transaction early, the overall transaction time is reduced. This time savings, multiplied by the number of write transactions that take place in a typical client/server application, can be significant.

Another advantage of the present invention described above, is the ability of the HAMM to copy large amounts of data (e.g., 8 Mb or larger) from volatile memory to nonvolatile memory. By using an auxiliary power supply, the volatile memory can be safely maintained until the data is copied. By contrast, some conventional systems must copy the data within the time interval just before the chip power drops below a predetermined voltage. Thus, these conventional systems can transfer only small amounts of data (e.g., 32K).

An advantage of using the auxiliary power supply as described above, is the ability to use different types of volatile memory, particularly memory that requires refresh, such as DRAM. The auxiliary power supply can be used to refresh the DRAM while data is being copied during unexpected system power failure.

An advantage of using isolation devices as described above, is the ability to isolate the HAMM from the host system's power supply during control operations to prevent spurious events (e.g., power spikes, short circuits) from corrupting the data while performing control operations.

Another advantage of the present invention is the added flexibility of responding to multiple triggering events, rather than just system power failures. This advantage is important because other events, such as O/S hang-up and unexpected system resets, can also cause data loss. Conventional systems that protect only against system power failures do no provide adequate data protection for many applications.

Still another advantage of the present invention is the ability to permanently store a pre-initialized O/S kernel image in nonvolatile memory, and to quickly copy it into system memory using control logic disposed in the HAMM. From an O/S point of view, this is equivalent to permanently storing an O/S kernel in volatile system memory. Most conventional systems cannot provide this function cost-effectively. Thus, the present invention provides an important advantage over conventional embedded systems, and thin file systems in particular, by simplifying both the hardware and software used to store and retrieve the O/S kernel code, thereby increasing system boot speed.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION OF THE INVENTION

While the present invention is described with reference to a client/server application, other applications may be used with the present invention without departing from the spirit and scope of the present invention, for example, database engines, peer-to-peer networks, networks that employ distributed file systems, and standalone computers. The term "data," as used herein, includes all forms of digital information including file system data, otherwise known as "meta" data. Generally, the present invention is applicable to any applications that can benefit from staging data in high speed memory while maintaining data integrity upon system failure.

Figure 1:
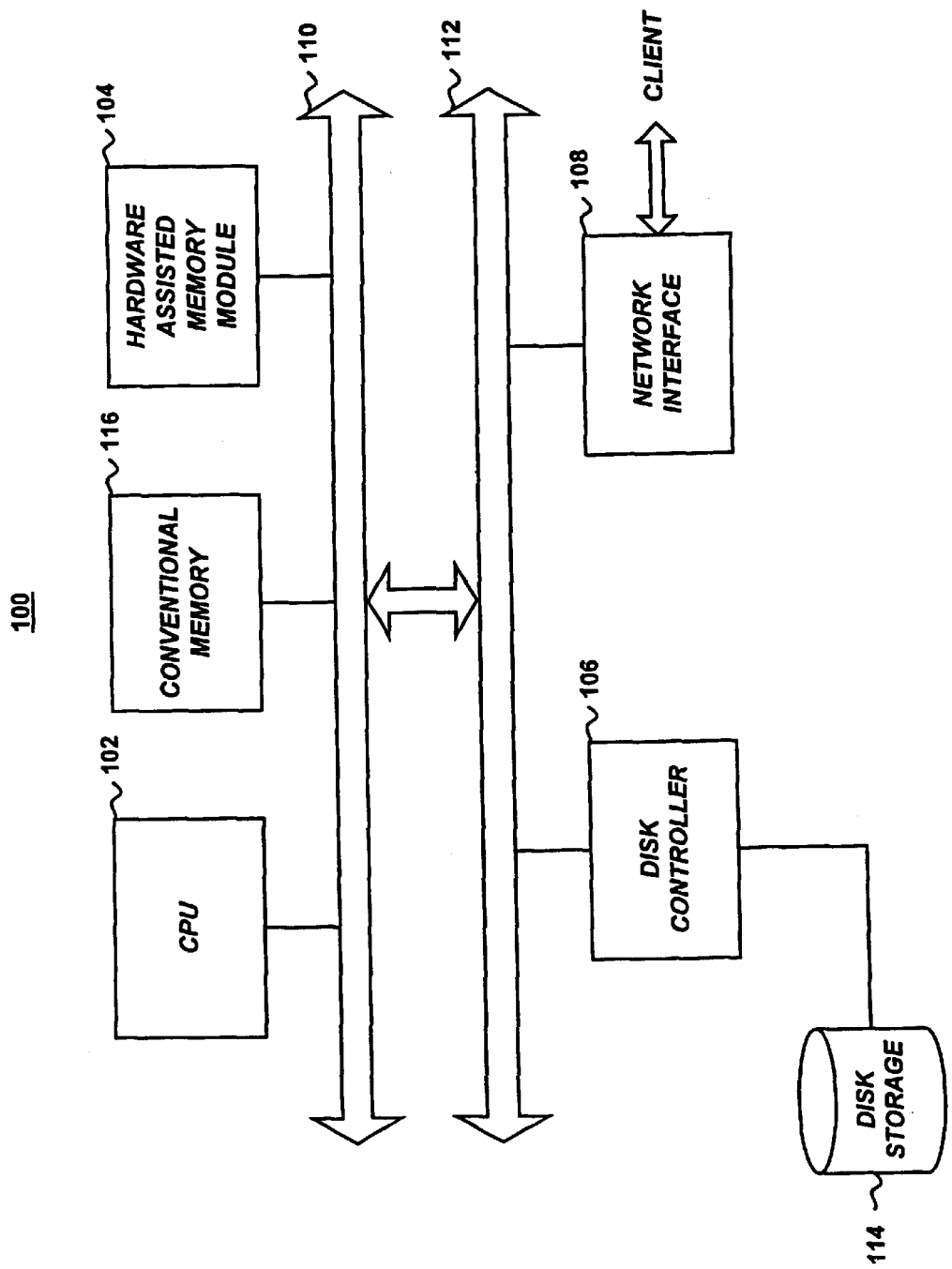
FIG. 1 is a functional block diagram of one embodiment of a file server system 100 in accordance with the present invention.

Referring to FIG. 1, there is shown a functional block diagram of one embodiment of file server system 100 (hereinafter also referred to as "host system 100") in accordance with the present invention. Host system 100 preferably includes a CPU 102, a hardware assisted memory module 104 (hereinafter also referred to as "HAMM 104"), a disk controller 106, a network interface 108, a system memory bus 110, an I/O bus 112, disk storage 114, and conventional memory 116. Host system 100 can be, for example, a conventional PC configured as a file server or, alternatively, a thin file server, such as the Plug & Stor™ 100 Thin Server, developed by Creative Design Solutions, Inc., Santa Clara, Calif.

CPU 102 can be a conventional computer processor, for example, a Pentium™ processor manufactured by Intel Corporation, Santa Clara, Calif. CPU 102 is coupled to system memory bus 110, which can be a conventional computer bus. System memory bus 110 is further coupled to I/O bus 112, which can be, for example, a Peripheral Component Interconnect (PCI) bus. The I/O bus 112 is coupled to network interface 108, which can be a conventional network interface (e.g., Ethernet) for providing bi-directional communication between host system 100 and one or more client computers. Coupled to I/O bus 112 is disk controller 106 for controlling the reading and writing of data to disk storage 114. Disk controller 106 can be a conventional hard disk controller, such as a Small Computer System Interface (SCSI) disk controller. Disk storage 114 is coupled to system memory bus 110 via disk controller 106. Disk storage 114 can be any conventional storage device used to store digital information, including, for example, hard disks and optical disk. Also shown in FIG. 1 is conventional memory 116, which is coupled to the system memory bus 110.

The HAMM 104 is a preferred embodiment of the present invention. The HAMM 104 is coupled to system memory bus 110 using conventional memory module formats, pin-outs, and/or packaging, for example, DIMM or SIMM. Preferably, the HAMM 104 replaces or supplements one or more conventional memory modules, and includes both volatile memory and nonvolatile memory. Multiple HAMMs can be coupled together as required by the system. The HAMM 104 is described in further detail below with respect to FIG. 2.

In accordance with the operation of host system 100, a client computer (not shown) communicates with host system 100 via network interface 108. Depending on the communication protocol (e.g., TCP/IP), if a client computer wants to store data in disk storage 114, the client computer sends a "write" request to host system 100. Upon acceptance of the client's "write" request, host system 100 receives data over the network and stores the data in volatile memory. Once the data is in volatile memory, host system 100 signals back to the client computer that the "write" transaction has been completed. The data remains stored in volatile memory until it can be safely stored to disk storage 114 via disk controller 106. If a catastrophic event occurs while all or some of the data is still in volatile memory, the HAMM 104 copies all or some of the data to nonvolatile memory to prevent data loss, as described below with respect to FIG. 2.

An advantage of the present invention is that completion of a "write" transaction occurs while data is still in volatile memory, rather than waiting for the data to be actually stored to disk. By signaling to the client that the "write" transaction has completed even when data is still in volatile memory, the write transaction time can be significantly reduced. This advantage is made possible by the HAMM 104, which assures that data in volatile memory is safely copied to nonvolatile memory.

Figure 2:
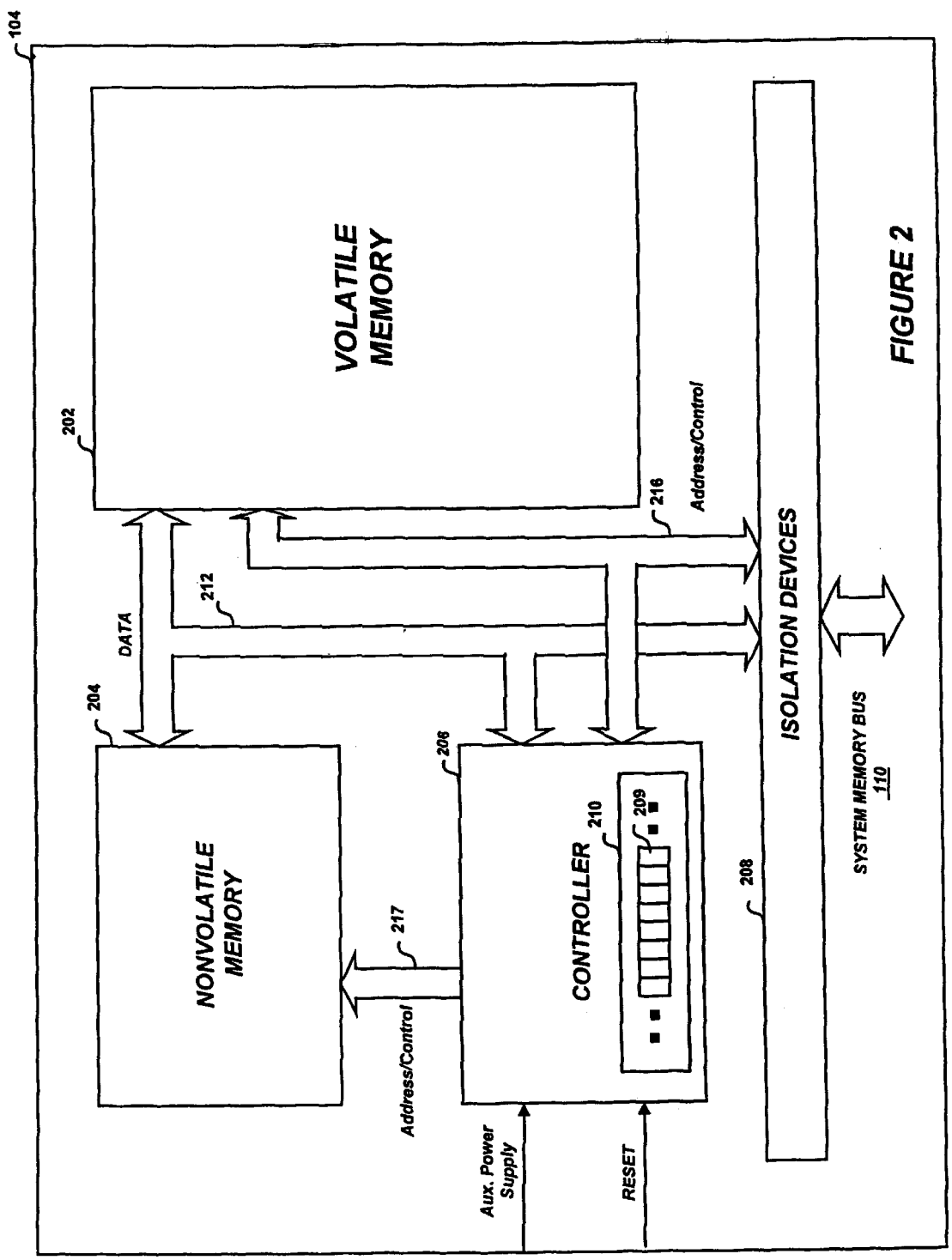
FIG. 2 is a functional block diagram of one embodiment of a hardware assisted memory module in accordance with the present invention.

Referring to FIG. 2, there is shown a functional block diagram of one embodiment of the HAMM 104 in FIG. 1 in accordance with the present invention. The HAMM 104 preferably includes volatile memory 202, nonvolatile memory 204, controller 206, isolation devices 208, and reserved memory 210. In a preferred embodiment, the volatile memory 202 is DRAM and the nonvolatile memory 204 is flash memory. Flash memory is integrated circuit memory that does not need continuous power to retain stored data. It has a limited life span of, for example, 100,000 write cycles. Typical flash memory is erased in blocks of data rather than single bytes of data, thus reducing the erase and write cycle times necessary to store data in such memories. Flash has relatively low cost and can be configured to have a fairly large size.

The amount of volatile memory 202 and nonvolatile memory 204 required can vary based on the needs of the host system 100. In one embodiment, the ratio of volatile memory 202 to nonvolatile memory 204 can be 2:1. For example, the HAMM 104 can include 8 Mb×8 DRAM and 4 Mb×8 flash memory, thus establishing a 2:1 ratio between DRAM and flash memory. Thus, in this example only half of the data in DRAM can be copied to flash memory.

It is noted that the present invention is not limited to DRAM or flash memory, and other types of memory can be used without departing from the spirit or scope of the present invention. For example, volatile memory 202 can include SRAM, Fast Page Mode DRAM (FPM DRAM), Extended Data Out DRAM (EDO), Synchronous DRAM (SDRAM), Double-data Rate SDRAM (DDR SDRAM), Direct Rambus™ DRAM (RDRAM), SyncLink™ DRAM (SLDRAM), Video RAM (VRAM), and Window RAM (WRAM). Additionally, nonvolatile memory 204 can include EEPROM, flash memory, and solid state disk.

Volatile memory 202 is coupled to system memory bus 110 (FIG. 1) through data bus 212 and address/control bus 216 via isolation devices 208. The isolation devices 208 can be transistors configured as on/off switches using conventional Complimentary Metal-oxide Semiconductor (CMOS) technology. The isolation devices 208 electrically isolate the HAMM 104 from the host system 100 in response to certain trigger events. This allows the HAMM 104 to run independent of the host system 100 after a catastrophic failure, even if the power to the host system 100 is lost.

Controller 206 is coupled to volatile memory 202 via address/control bus 216 and data bus 212. Controller 206 is also coupled to nonvolatile memory 204 via data bus 212 and address/control bus 217. Buses 216, 217 include both address and control signals for addressing and controlling volatile and nonvolatile memories 202, 204, respectively. Generally, controller 206 includes control logic, a clock, a power interface (e.g., battery interface), and a timing device. The control logic is for generating the address and control signals on buses 216, 217 for accessing volatile memory 202 and nonvolatile memory 204. The clock (e.g., a crystal oscillator), is used to time various control operations. The power interface provides a connection to the auxiliary power source, such as a battery. The interface can include conventional circuitry for recharging a battery. The timing device is, for example, a watchdog timer, for triggering operating system hang-up. A preferred embodiment of controller 206 is described in further detail below with respect to FIG. 5.

Controller 206 manages control operations for the HAMM 104 which include store and restore operations. The store operation copies data from volatile memory 202 to nonvolatile memory 204. The restore operation copies data from nonvolatile memory 204 to volatile memory 202. The store operation is only performed if there is catastrophic failure to preserve the life span of nonvolatile memory 202, for example, flash memory, which may have a finite write life of about, for example, 100,000 write cycles.

In a preferred embodiment of HAMM 104, a block of reserved memory 210 contains a control register 209 that is monitored by controller 206. The O/S communicates with controller 206 by writing to control register 209. For example, the O/S can reset the watchdog timer and inform the HAMM 104 of the status of a host system 100 shutdown by setting one or more bits in control register 209. To ensure that reserved memory 210 remains exclusive to communications between the O/S and controller 206, an access sequence can be employed that prevents accidental access to reserved memory 210. Thus, if a software application steps into the address range of reserved memory 210, the probability of falsely triggering a control operation is virtually zero. The programming of controller 206 will determine the address range of reserved memory 210.

During a store operation, controller 206 generates the appropriate addresses on bus 216 to enable the copying of data from volatile memory 202 to nonvolatile memory 204 via data bus 212. The type of addressing scheme employed by controller 206 depends on the type of memory used in the HAMM 104. For example, DRAM could require a Column Access Select (CAS) addressing scheme and flash memory could require a most significant bit addressing scheme. Both addressing schemes are well-known in the art. In a preferred embodiment, controller 206 can interpret non-standard addressing/control through bus 216 to enable the host system 100 to access reserved memory 210, as described in further detail below. In the preferred embodiment, controller 206 copies data from volatile memory 202 to nonvolatile memory 204 by controlling the address and control signals on buses 216, 217 of volatile memory 202 and nonvolatile memory 204, respectively, as shown in FIG. 2.

Store operations are executed by controller 206 for at least one of the following trigger events: 1) O/S hang-up, 2) unexpected system reset, or 3) unexpected power failure. Each of these trigger events are described, in turn, below. It is noted, however, that the present invention is not limited to the events described below, and other trigger events are possible without departing from the spirit and scope of the present invention.

O/S Hang-up

A trigger event occurs when the watchdog timer in the HAMM 104 times out. In response to this trigger event, controller 206 initiates a store operation to copy all or part of the data stored in volatile memory 202 to nonvolatile memory 204. In an embodiment that uses DRAM, controller 206 can also maintain refresh during store and restore operations. Preferably, the watchdog timer is reset by a "write" to one or more bits in control register 209.

Unexpected System Reset & System Power Failure

Generally, a power failure is "unexpected" if the HAMM 104 is not forewarned by the O/S of a normal shutdown. Controller 206 is coupled to an auxiliary power supply, such as a battery, which is used if an unexpected system power failure occurs. If the system power fails, isolation devices 208 will turn off and thereby electrically isolate the HAMM 104 from the host system 100. During this time, the HAMM 104 receives its power from the auxiliary power supply, which provides for safe copying of data from volatile memory 202 to nonvolatile memory 204. The auxiliary power supply can also be used to refresh DRAM to maintain data while waiting to be copied. The host system 100 should be properly shutdown by the O/S before replacing the auxiliary power supply. This will ensure that data is properly stored in the event of unexpected power failure.

If there is a normal or expected shutdown the O/S will warn the controller 206 so that the controller 206 does not perform a store operation after system power is terminated. Preferably, the O/S warns the controller 206 of a normal or expected shutdown by writing to the control register 209. The warning can be communicated by, for example, setting one or more bits to indicate a normal shutdown (e.g., setting a bit to "0"). The controller 206 can determine whether the last shutdown was in response to a catastrophic failure by reading one or more bits in control register 209. Preferably, the control register 209 is read by the controller 206 after a reset operation is completed by the Basic Input/Output System (BIOS), thereby enabling BIOS to run system diagnostics. If the O/S wants the data restored, the O/S writes to one or more bits in control register 209 to order the controller 206 to restore the data stored in nonvolatile memory 204. Preferably, the restore operation is the reverse of the store operation described above.

In another embodiment of the present invention, the HAMM 104 provides boot-time O/S kernel loading support. A pre-initialized kernel image is permanently stored in nonvolatile memory 204 of HAMM 104, as if it were copied from the volatile memory 202 by the store operation. During the system boot, the kernel image is copied into the volatile memory 202 using the restore operation described above. Thus, from a user's point of view, the kernel is permanently resident in the volatile memory 202.

The above method has several advantages over conventional methods that keep the kernel in some additional nonvolatile memory in a special range of memory locations. First, copying the kernel from nonvolatile memory into volatile memory requires significant software/firmware work which makes system porting from platform to platform difficult. With the present invention, the kernel is logically stored in a range of volatile memory, and no additional software/firmware is needed to load the kernel. Second, the system boot speed is increased since there is no software copying and the kernel is already partially initialized. This is important for appliance style systems where short initialization time after power-up is expected.

Figure 3:
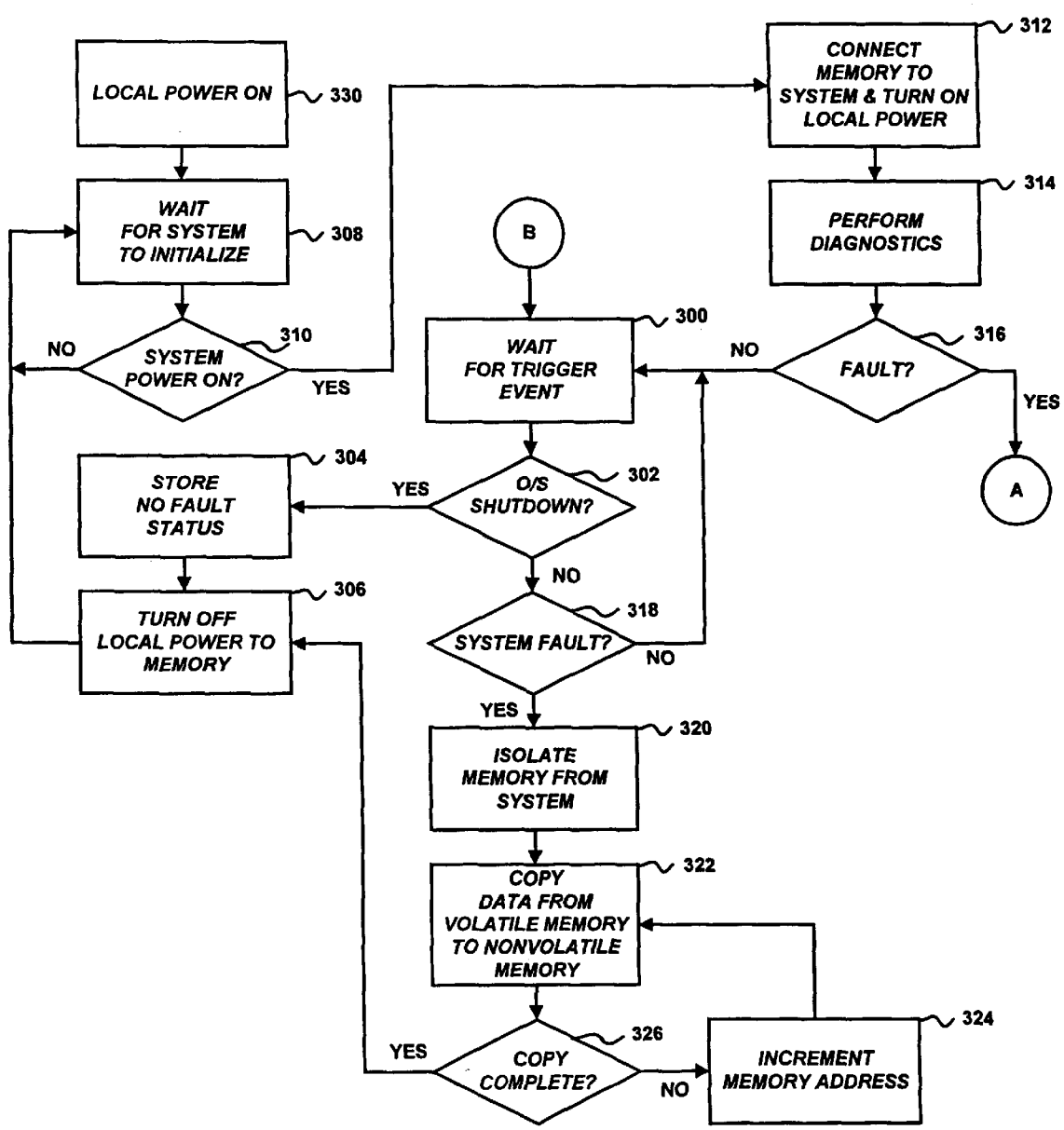
FIG. 3 is a flow diagram of one embodiment of control logic illustrating event detection and store operations provided by the hardware assisted memory module in accordance with the present invention.

Referring to FIG. 3, there is shown a flow diagram of one embodiment of control logic illustrating event detection and store operations provided by the HAMM 104 in FIG. 2 in accordance with the present invention. During normal operation of the host system 100, the HAMM 104 waits 300 for a trigger event to occur. In the preferred embodiment, trigger events include operating system hang-up and/or unexpected power failure or system reset, as described above with respect to FIG. 2.

Unexpected power failures are detected by controller 206, which can be hardwired to the power of host system 100 for detecting voltage drops. Similarly, unexpected system reset events can be detected by controller 206 by monitoring, for example, a RESET signal coupled directly to the HAMM 104. The RESET signal can be hardwired to a reset button on the host computer system.

O/S hang-ups can be detected by monitoring the watchdog timer in the HAMM 104. The watchdog timer can be reset by the O/S through control register 209. A reset bit can be used for this purpose.

The status stored 304 in control register 209 in reserved memory 210 is always "no fault," unless there is an abnormal shutdown, in which case the status indicates a faulty shutdown. Control register 209 is read by controller 206 to determine the status of the shutdown when the system reboots at a later time. After storing 304 the "faulty shutdown" status, the HAMM 104 turns off 306 the auxiliary power supply to volatile memory 202, and waits 308 for the host system 100 to reinitialize.

If 310 the system power is on, HAMM 140 connects 312 volatile memory 202 to system memory bus 110 and turns on the auxiliary power supply. In the preferred embodiment, the auxiliary power supply is a rechargeable battery. Thus, by leaving the battery on during normal system operation, the battery can be recharged by the system power.

After the auxiliary power supply is turned on, the BIOS performs 314 conventional diagnostics. Upon completion of the diagnostics, the stored status in reserved memory 210 is examined to determine the reason for the last shutdown. If 316 the status is "no fault," then the HAMM 104 waits 300 for the next trigger event, as previously described above. If the status is "fault," the last system shutdown was due to a system fault, and the HAMM 104 initiates a restore operation, as described with respect to FIG. 2.

An advantage of using the control register 209 and stored status described above, is the added flexibility in discriminating between normal shutdowns and unexpected system failures. Nonvolatile memory 204, such as flash memory, has a finite write life (e.g., 100,000 write cycles). By not copying data from volatile memory 202 to nonvolatile memory 204 for normal shutdowns, the life span of the nonvolatile memory is increased. Preferably, control register 209 is in reserved memory 210, which is outside the address map of volatile memory 202. This reduces the probability of executing an erroneous control operation (e.g., store and restore operations) due to a software application stepping on the memory address of control register 209. Additionally, a required access sequence to the address range corresponding to reserved memory 210 can be used to further eliminate the probability of executing an erroneous control operation.

If 318 a system fault occurs, such as a power failure, system reset, or a O/S hang-up, the HAMM 104 isolates 320 volatile memory 202 from system memory bus 110 by turning off isolation devices 208. Preferably, isolation devices 208 comprise CMOS switches which are biased open during normal system operation. In the event of a system fault, the CMOS switches are biased close, thereby electrically isolating the HAMM 104 from the host system 100. Upon the isolation of the HAMM 104, the store operation begins. In the preferred embodiment, the store operation includes copying 322 data, address by address (e.g., 64 bits at a time), from volatile memory 202 to nonvolatile memory 204 using, for example, a CAS addressing scheme. Controller 206 controls the address and control signals for both volatile memory 202 and nonvolatile memory 204. After the data stored at the current address is safely stored in nonvolatile memory 204, the volatile memory address is incremented 324 until the transfer is complete. If 326 the transfer is complete, the HAMM 104 turns off 306 the auxiliary power supply to memory, then waits 308 for the host system 100 to initialize, as previously described above.

It is noted that in practical applications it may be necessary to replace or reset the auxiliary power supply. In such cases, it is assumed that O/S properly shutdown the host system 100. In the event that the auxiliary power supply is replaced or reset 330, the HAMM 104 will wait 308 for the system to reinitialize, then proceed as previously described above.

Figure 4:
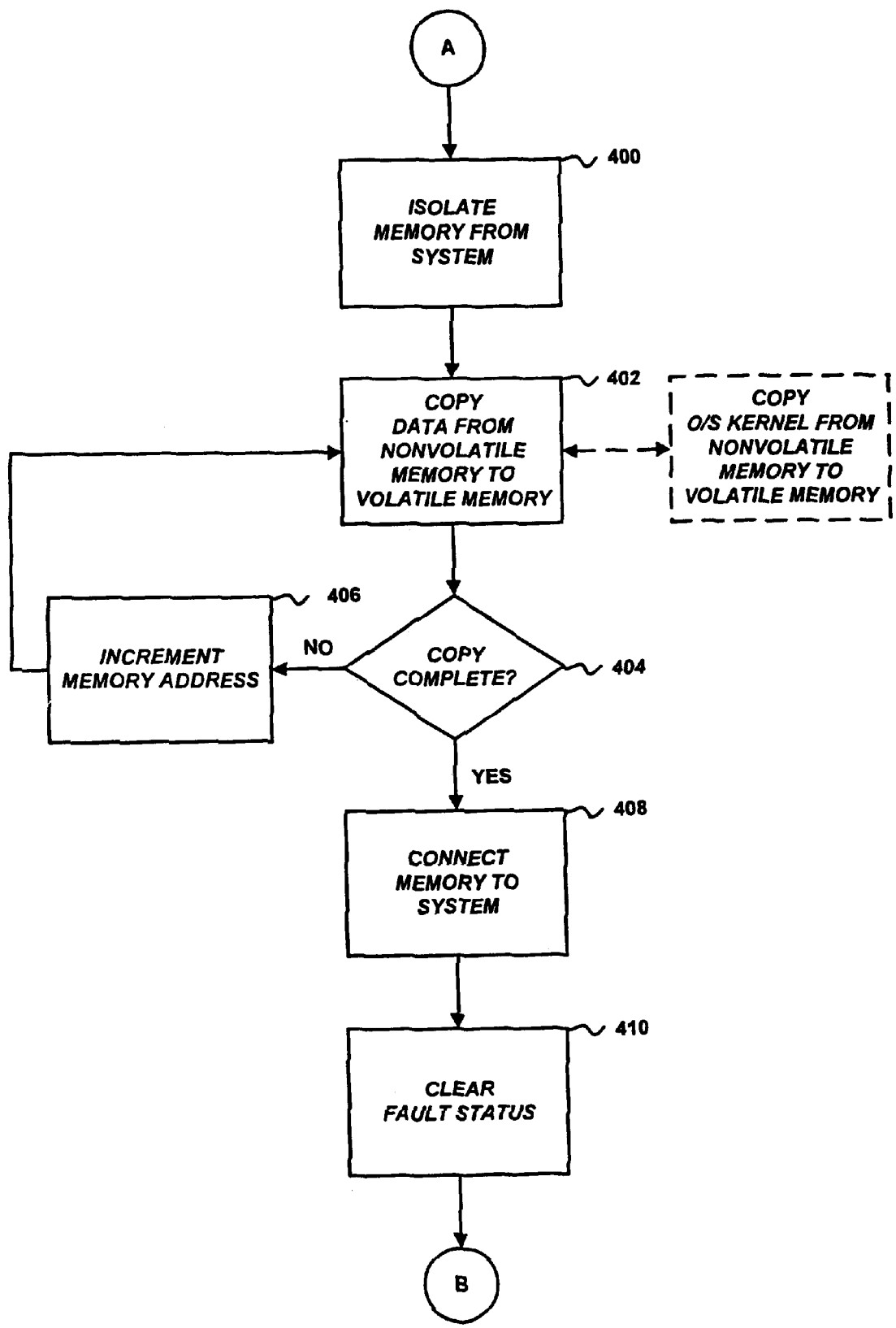
FIG. 4 is a flow diagram of one embodiment of control logic illustrating restore operations provided by the hardware assisted memory module in accordance with the present invention.

Referring to FIG. 4, there is shown a flow diagram of one embodiment of control logic illustrating restore operations provided by the HAMM 104 in FIG. 2 in accordance with the present invention. If 316 a system fault is indicated by one or more bits in control register 209 being set (e.g., logic "1"), the HAMM 104 isolates 400 volatile memory 202 from the host system 100, then begins a restore operation. The restore operation includes copying 402 data from nonvolatile memory 204 to volatile memory 202. In a preferred embodiment, the restore operation is the reverse of the store operation, wherein data is copied address by address. If 404 the transfer is complete, volatile memory 202 is connected 408 to system memory bus 110, the fault status is cleared 410 from the control register 209, and the HAMM 104 waits 300 for the next trigger event. Otherwise, the current volatile memory address is incremented 406 to read out the next memory line (e.g., 64 bits of data).

An advantage of using the auxiliary power supply described above, is the ability of the HAMM 104 to copy large amounts of data (e.g., 8 Mb or larger) from volatile memory 202 to nonvolatile memory 204. By using an auxiliary power supply, the volatile memory 202 can be safely maintained until the data is copied. By contrast, some conventional systems must copy the data within the time interval just before the chip power drops below a predetermined voltage. Thus, these conventional systems can only copy small amounts of data (e.g., 32K).

An additional advantage of using the auxiliary power supply as described above, is the ability to use different types of volatile memory, particularly memory that requires refresh, such as DRAM. The auxiliary power supply can be used to refresh the DRAM while data is being copied during unexpected system power failure.

An advantage of using isolation devices 208 described above, is the ability to isolate the HAMM 104 from the system power during control operations to is prevent spurious events (e.g., power spikes, short circuits) from corrupting the data while performing control operations.

Another advantage of the present invention is the added flexibility of responding to multiple triggering events, rather than just system power failures. This is important because other events, such as O/S hang-up and unexpected system resets, can also cause data loss. Conventional systems that protect only against system power failures do no provide adequate data protection for many applications.

Still another advantage of the present invention can best be realized in a client/server application where memory access time is reduced during write transactions. Because the HAMM 104 provides assurance that data will be backed-up in the event of a catastrophic failure, a file server system can complete a transaction with a client even though all or part of the data to be transferred is still in volatile memory in the file server system. By completing the write transaction early, the overall transaction time is reduced. This time savings, multiplied by the number of write transactions that take place in a typical client/server application, can be significant.

Figure 5:
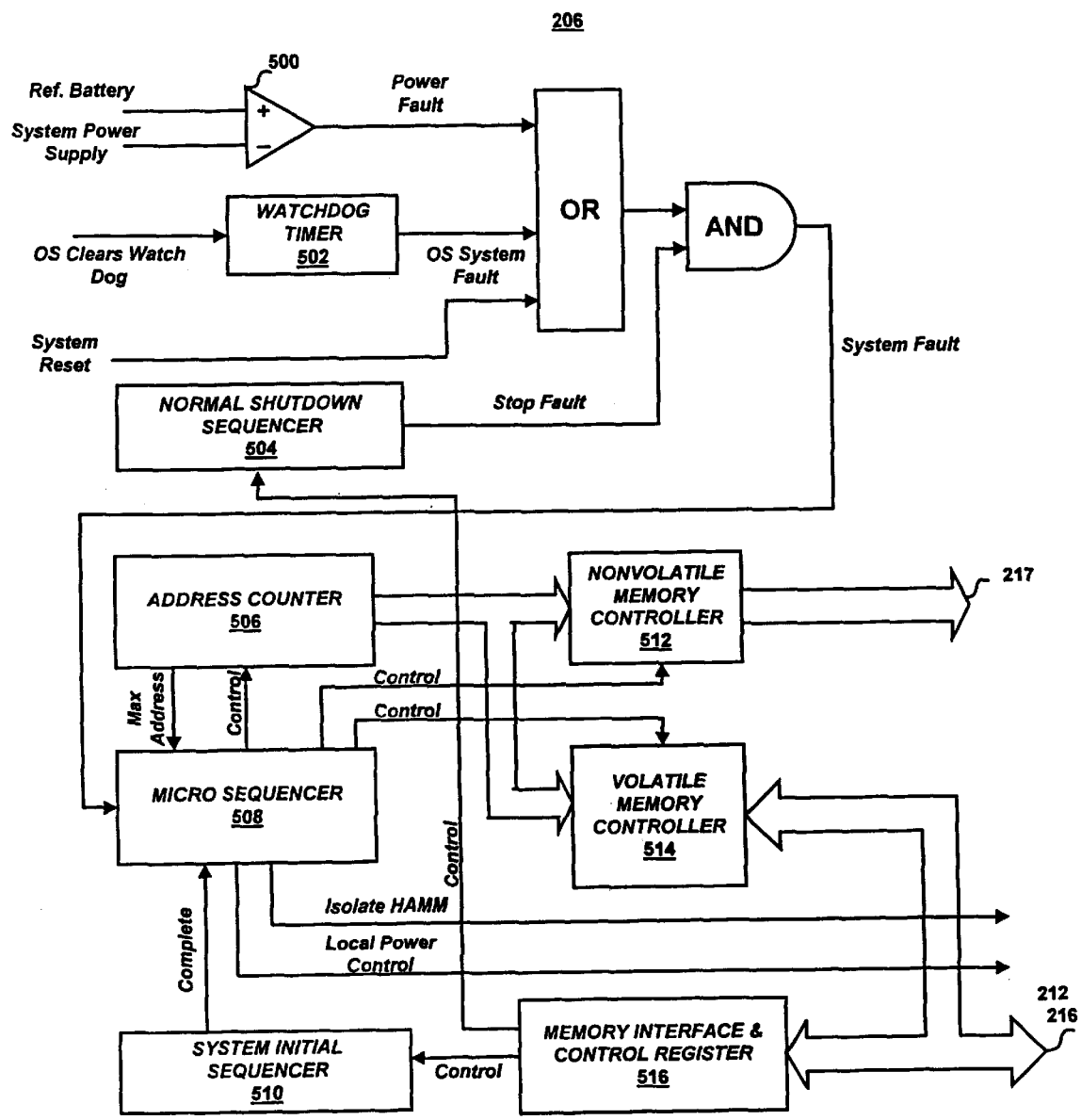
FIG. 5 is a functional block diagram of one embodiment of the controller in FIG. 2 for executing the control logic in FIGS. 3 and 4.

Referring to FIG. 5, there is shown a functional block diagram of one embodiment of controller 206 in FIG. 2 for executing the control logic in FIGS. 3 and 4. The controller 206 includes a voltage monitor 500, a watchdog timer 502, a normal shutdown sequencer 504, an address counter 506, a micro sequencer 508, a system initial sequencer 510, a nonvolatile memory controller 512, a volatile memory controller 514, and a memory interface and control register 516. The controller 206 manages the store operation by executing the control logic that controls the address and control signals on buses 216, 217 to the volatile memory 202 and nonvolatile memory 204, respectively. The controller 206 generally functions as sets of state machines that, based on the input from the system, store and restore the volatile memory 202.

The O/S can shut down the host system 100 normally by writing to a control register 209 in the controller 206, which appears to the O/S to be part of the address space of the volatile memory 202. Other trigger events are handled by the controller 206 as described below.

Unexpected system resets or power failures are detected by the voltage monitor 500 which compares a reference battery and a system power supply, and provides a POWER FAULT signal in response to the system power supply falling below the reference battery. If a STOP FAULT signal from the normal shutdown sequencer 504 is not logic low (e.g., STOP FAULT="1"), a SYSTEM FAULT trigger event has occurred, thereby starting an isolation and store operation, as described with respect to FIG. 3.

The watchdog timer 502 is a free running counter which is periodically reset by the O/S writing to the control register 209. If the O/S becomes hung but is still able to reset the watchdog timer 502, the SYSTEM FAULT trigger event will not start the isolation and store operation. In that event, the voltage monitor 500 or the system reset is needed to safely store the information. The system reset is also used to start the isolation and store operation. It is subject to the STOP FAULT signal, which if not logic low will cause the SYSTEM FAULT trigger event that will start the isolation and store operation.

The normal shutdown sequencer 504 generates a STOP FAULT signal to keep the store operation from happening at every shutdown. The normal shutdown sequencer 504 performs a set of memory operations on the control register 209 in the controller 206. These operations can be as simple as setting a single bit. Some care should be taken to ensure that the memory operation does not cause the HAMM 104 to not execute the isolation and store operation when needed. This is achieved with a few write operations to the control resister 209 with a code that can be compared to a fixed value for determining if the O/S is performing a normal shutdown, thereby ensuring that the HAMM 104 does not execute the isolation and store operation. This prevents the HAMM 104 from accidentally stopping a SYSTEM FAULT operation.

The address counter 506 provides a local address for the store and restore operations. It is coupled to the memory controllers 512, 514, for addressing the memories 204, 202, respectively. The nonvolatile memory controller 512 is used for addressing and communicating with the nonvolatile memory 204 via bus 217. The nonvolatile memory controller 512 is also coupled to the micro sequencer 508, for receiving additional control signals for erasing the nonvolatile memory 204 to prepare for the next store operation. The volatile memory controller 514 is coupled to the volatile memory 202 via bus 216. For embodiments that use DRAM, the volatile memory controller 514 is also coupled to the micro sequencer 508 for controlling the refresh time for the volatile memory 202.

The micro sequencer 508 is the main control function for the HAMM 104. The micro sequencer 508 functions are described by the flow diagram in FIG. 3. It is important to note from FIG. 5 that the micro sequencer 508 controls the address counter 506, the nonvolatile memory controller 512, the volatile memory controller 514, and receives input from all other major blocks. After the SYSTEM FAULT trigger event is issued, the micro sequencer 508 isolates the HAMM 104 from the host system 100 and completes the store operation, including turning off power until the host system 100 is restarted. After the host system 100 is restarted, the micro sequencer 508 checks to see if the O/S wants the memory restored. If the O/S wants memory restored, the micro sequencer 508 isolates the HAMM 104 from the host system 100 and restores the volatile memory 202 before connecting the HAMM 104 back to the host system 100.

The system initial sequencer 510 is part of the startup operation for the HAMM 104. The BIOS must first complete its system checks before the micro sequencer 508 can restore the volatile memory 202. After that the O/S must signal the HAMM 104 that it can proceed and check if memory should be restored. Not all restore operations will occur after a power-off condition, but all restore operations will take place after the BIOS has rebooted the host system 100. The operation will be very similar to the normal shutdown sequence, except for the type of code used.

The memory interface and control register 516 is the read part of the memory interface and is used by the HAMM 104 to receive commands from the O/S. It decodes the address and control for normal memory cycles and stores part of the data for use on shutdown and initialization sequences.

Buses 216 and 212 are subsets of the total memory bus coupled to the HAMM 104. To reduce pin count on the controller 206, buses 216, 212 may contain less than all of the data signals.

Although the present invention has been described in considerable detail with reference to certain preferred embodiments thereof, other embodiments are possible. For example, the present invention is applicable to applications involving database engines, peer-to-peer networks, networks that employ distributed file systems, and standalone computers. Therefore, the spirit and scope of the appended claims should not be limited to the description of the preferred embodiments contained herein.

What is claimed is:

1. An apparatus coupled to a host computer system for communicating digital information between volatile and nonvolatile memory in response to a trigger event, the apparatus comprising:

a volatile memory coupled to an information source for receiving and storing the digital information;

a nonvolatile memory coupled to the volatile memory for receiving and storing the digital information communicated from the volatile memory; and a controller coupled to the volatile memory and the nonvolatile memory for controlling the communication of the digital information between the volatile memory and the nonvolatile memory in response to the trigger event, the controller configured to determine the type of the trigger event from control information stored in the volatile memory.

2. The apparatus of claim 1, wherein the volatile memory is DRAM and the nonvolatile memory is flash memory.

3. The apparatus of claim 1, wherein the control information is stored in a portion of memory outside the memory map of the volatile memory.

4. The apparatus of claim 1, wherein the trigger event comprises at least one from the group of trigger events comprising: unexpected power failure, unexpected system reset, and operating system hang-up.

5. The apparatus of claim 1, further including
isolation devices for electrically isolating the volatile memory, nonvolatile memory and controller from the host computer system in response to the trigger event.

6. The apparatus of claim 5, wherein the isolation devices are CMOS devices.

7. The apparatus of claim 1, further including
an auxiliary power source for providing power to the apparatus in response to the trigger event.

8. The apparatus of claim 7, wherein the auxiliary power source is a battery.

9. The apparatus of claim 8, wherein the battery is recharged by the host computer system during normal operation.

10. The apparatus of claim 1, wherein the control information is provided by the operating system of the host computer system.

11. The apparatus of claim 1, wherein the apparatus couples to the host computer system through a conventional computer memory interface.

12. The apparatus of claim 1, wherein the volatile memory includes a control register for storing the control information.

13. The apparatus of claim 1, the controller further comprising:
a control circuit for generating address and control signals for accessing the volatile and nonvolatile memory;
a power interface circuit coupled to an auxiliary power supply for providing power to the apparatus in response to the trigger event; and
a timing device for determining if the host operating system of the host computer system has hung.

14. The apparatus of claim 13, wherein the timing device is reset by the control information stored in the volatile memory.

15. The apparatus of claim 13, further including a clock generator coupled to the control circuit for providing a clock to the control circuit.

16. The apparatus of claim 1, wherein an image of an operating system kernel is stored in the nonvolatile memory.

17. A memory backup system coupled to a host computer for providing memory backup in response to a trigger event, the system comprising:
a volatile memory coupled to an information source for receiving and storing the digital information;
a nonvolatile memory coupled to the volatile memory for receiving and storing the digital information communicated from the volatile memory;
a controller coupled to the volatile memory and the nonvolatile memory for controlling the communication of the digital information between the volatile memory and the nonvolatile memory in response to the trigger event, the controller configured to determine the type of the trigger event from control information stored in the volatile memory;
isolation devices for electrically isolating the system from the host computer in response to the trigger event; and
an auxiliary power source for providing power to the system in response to the trigger event.

18. The system of claim 17, wherein the trigger event comprises at least one from a group of trigger events comprising: unexpected power failure, unexpected system reset, and operating system hang-up.

19. The system of claim 17, wherein the control information is provided by the operating system of the host computer.

20. The system of claim 17, wherein the volatile memory includes a control register for storing the control information.

21. The system of claim 17, wherein an image of an operating system kernel is stored in the nonvolatile memory.

22. A memory backup method using a hardware assisted memory module, comprising the steps of:
detecting a trigger event from a host computer system, the host computer system coupled to the hardware assisted memory module;
determining if the trigger event is an unexpected host computer system failure or a normal host computer system shutdown by examining a data structure in volatile memory;
copying digital information from volatile memory to nonvolatile memory if the type of the trigger event is an unexpected host computer system failure; and
storing control information relating to the type of the trigger event in volatile memory.

23. The method of claim 22, further including the steps of:
retrieving the stored control information from volatile memory;
determining from the control information the type of the trigger event; and
copying the digital information from nonvolatile memory to volatile memory if the type of the trigger event was an unexpected system failure.

24. The method of claim 22, further including the steps of:
electrically isolating the hardware assisted memory module from the host computer system; and
coupling the hardware assisted memory module to an auxiliary power source.

25. The method of claim 22, the detecting step including monitoring the host computer system for power failure.

26. The method of claim 22, the detecting step including monitoring the host computer system for a system reset.

27. The method of claim 22, detecting step including monitoring the host computer system for an operating system hang-up.

28. The method of claim 27, the monitoring step including the steps of:
setting a watchdog timer; and
performing the storing step if the watchdog timer exceeds a predetermined time limit.

29. The method of claim 22, the storing step further including the steps of:
providing a unique address sequence for accessing a portion of reserved volatile memory for storing the control information.

30. The method of claim 22, further including the step of:
copying an operating system kernel from nonvolatile memory to volatile memory.

31. A computer-readable medium in a hardware assisted memory module containing instructions thereon, which, when executed by a processor, perform the steps of:
detecting a trigger event from a host computer system, the host computer system coupled to the hardware assisted memory module;
determining if the trigger event is an unexpected host computer system failure or a normal host computer system shutdown by examining a data structure in volatile memory;

copying digital information from volatile memory to nonvolatile memory if the type of the trigger event is an unexpected host computer system failure; and storing control information relating to the type of the trigger event in volatile memory.

32. The computer-readable medium of claim 31, wherein the instructions further comprise:

retrieving the stored control information from volatile memory;

determining from the control information the type of the trigger event; and copying the digital information from nonvolatile memory to volatile memory if the type of the trigger event was an unexpected system failure.

33. The computer-readable medium of claim 31, wherein the instructions further comprise:

electrically isolating the hardware assisted memory module from the host computer system; and coupling the hardware assisted memory module to an auxiliary power source.

34. The computer-readable medium of claim 31, wherein the instructions further comprise:

monitoring the host computer system for power failure.

35. The computer-readable medium of claim 31, wherein the instructions further comprise:

monitoring the host computer system for a system reset.

36. The computer-readable medium of claim 31, wherein the instructions further comprise:

monitoring the host computer system for an operating system hang-up.

37. The computer-readable medium of claim 31, wherein the instructions further comprise:

setting a watchdog timer; and performing the storing step if the watchdog timer exceeds a predetermined time limit.

38. The computer-readable medium of claim 31, where the instructions further comprise:

providing a unique address sequence for accessing a portion of reserved volatile memory for storing the control information.

39. The computer-readable medium of claim 31, wherein the instructions further comprise:

copying an operating system kernel from nonvolatile memory to volatile memory.

40. A computer-readable medium in a hardware assisted memory module containing instructions thereon, which, when executed by a processor, perform the steps of:

detecting a trigger event from a host computer system, the host computer system coupled to the hardware assisted memory module;

determining if the trigger event is an unexpected host computer system failure or a normal host computer system shutdown by examining a data structure in volatile memory;

storing control information relating to the type of the trigger event in volatile memory;

electrically isolating the hardware assisted memory module from the host computer system;

coupling the hardware assisted memory module to an auxiliary power source; and copying digital information from volatile memory to nonvolatile memory if the type of the trigger event is an unexpected host computer system failure.

41. A memory backup system, comprising:

a volatile memory for receiving and storing digital information from an information source;

a nonvolatile memory for receiving and storing the digital information communicated from the volatile memory;

a control register for storing control information that indicates the nature and occurrence of a trigger event; and a controller for transferring the digital information between the volatile memory and the nonvolatile memory in response to the control information indicating that the trigger event has occurred.

42. The system of claim 41, wherein the trigger event is a power failure.

43. The system of claim 41, wherein the trigger event is a system reset.

44. The system of claim 41, wherein the trigger event is an operating system hang-up.

45. The system of claim 41, wherein the control information further indicates the nature and occurrence of a second trigger event and a third trigger event, and the controller transfers the digital information between the volatile memory and the nonvolatile memory in response to the control information indicating that any of the trigger events has occurred.

46. The system of claim 45, wherein the trigger event is a power failure, the second trigger event is a system reset and the third trigger event is an operating system hang-up.

47. The system of claim 41, wherein the system includes isolation devices, and the controller instructs the isolation devices to electrically isolate the system from the information source in response to the control information indicating that the trigger event has occurred.

48. The system of claim 41, wherein the system is adapted to be directly connected to a system memory bus that is directly connected to a central processing unit.

49. The system of claim 41, wherein the control register is within the volatile memory and outside a memory map of the volatile memory.

50. The system of claim 41, wherein the controller transfers the digital information between the volatile memory and the nonvolatile memory when the trigger event is unexpected by an operating system, and the controller alters the control information to indicate the absence of the trigger event in response to the operating system indicating that the trigger event is expected.

51. A memory backup system, comprising:

a volatile memory for receiving and storing digital information from an information source;

a nonvolatile memory for receiving and storing the digital information communicated from the volatile memory; and a controller for (1) examining a data structure in the volatile memory to determine whether a trigger event is expected or unexpected by an operating system, (2) transferring the digital information between the volatile memory and the nonvolatile memory if the trigger event is unexpected by the operating system, and (3) not transferring the digital information between the volatile memory and the nonvolatile memory if the trigger event is expected by the operating system.

52. The system of claim 51, wherein the controller includes a volatile memory controller coupled to the volatile memory and a nonvolatile memory controller coupled to the nonvolatile memory.

53. The system of claim 52, wherein the controller includes an address counter coupled to the volatile memory controller and the nonvolatile memory controller.

54. The system of claim 53, wherein the controller includes a microsequencer coupled to the volatile memory controller, the nonvolatile memory controller and the address counter.

55. The system of claim 51, wherein the controller includes a voltage monitor that indicates a system power supply failure when a system power supply falls below a reference voltage level, a timer that indicates the operating system is hung when the operating system fails to reset the timer, and a system reset line that indicates when a system reset is activated.

56. The system of claim 55 wherein the controller includes an OR gate with separate inputs coupled to outputs of the voltage monitor, the timer and the system reset line.

57. The system of claim 56, wherein the controller includes a normal shutdown sequencer that indicates a normal system shutdown.

58. The system of claim 57, wherein the controller includes an AND gate with separate inputs coupled to outputs of the OR gate and the normal shutdown sequencer.

59. The system of claim 51, wherein the data structure also indicates the nature of the trigger event.

60. The system of claim 51, wherein the system is adapted to be directly connected to a system memory bus that is directly connected to a central processing unit.

61. A memory backup system, comprising:
   a volatile memory for receiving and storing digital information from an information source;
   a nonvolatile memory for receiving and storing the digital information communicated from the volatile memory;
   a control register for storing control information that indicates the occurrence of first and second trigger events; and
   a controller for transferring the digital information between the volatile memory and the nonvolatile memory in response to the control information indicating that any of the trigger events has occurred.

62. The system of claim 61, wherein the trigger events are selected from the group consisting of a power failure, a system reset and an operating system hang-up.

63. The system of claim 61, wherein the first trigger event is a power failure, and the second trigger event is selected from the group consisting of a system reset and an operating system hang-up.

64. The system of claim 61, wherein the first trigger event is a system reset.

65. The system of claim 61, wherein the first trigger event is an operating system hang-up.

66. The system of claim 61, wherein the control information further indicates the nature of the trigger events.

67. The system of claim 61, wherein the system includes isolation devices, and the controller instructs the isolation devices to electrically isolate the system from the information source in response to the control information indicating that any of the trigger events has occurred.

68. The system of claim 61, wherein the system is adapted to be directly connected to a system memory bus that is directly connected to a central processing unit.

69. The system of claim 61, wherein the control register is within a reserved portion of the volatile memory and outside a memory map of the volatile memory.

70. The system of claim 61, wherein the controller transfers the digital information between the volatile memory and the nonvolatile memory when the first trigger event has occurred and is unexpected by an operating system, and the controller alters the control information to indicate the absence of the first trigger event in response to the operating system indicating that the first trigger event is expected.

71. A memory backup system, comprising:
   a volatile memory for receiving and storing digital information from an information source;
   a nonvolatile memory for receiving and storing the digital information communicated from the volatile memory;
   a control register for storing control information that indicates the occurrence of first and second trigger events, wherein the control register is within the volatile memory; and
   a controller for transferring the digital information between the volatile memory and the nonvolatile memory in response to the control information indicating that any of the trigger events has occurred.

72. The system of claim 71, wherein the trigger events are selected from the group consisting of a power failure, a system reset and an operating system hang-up.

73. The system of claim 71, wherein the first trigger event is a power failure, and the second trigger event is selected from the group consisting of a system reset and an operating system hang-up.

74. The system of claim 71, wherein the first trigger event is a system reset.

75. The system of claim 71, wherein the first trigger event is an operating system hang-up.

76. The system of claim 71, wherein the control information further indicates the nature of the trigger events.

77. The system of claim 71, wherein the system includes isolation devices, and the controller instructs the isolation devices to electrically isolate the system from the information source in response to the control information indicating that any of the trigger events has occurred.

78. The system of claim 71, wherein the system is adapted to be directly connected to a system memory bus that is directly connected to a central processing unit.

79. The system of claim 71, wherein the control register is within a reserved portion of the volatile memory and outside a memory map of the volatile memory.

80. The system of claim 71, wherein the controller transfers the digital information between the volatile memory and the nonvolatile memory when the first trigger event has occurred and is unexpected by an operating system, and the controller alters the control information to indicate the absence of the first trigger event in response to the operating system indicating that the first trigger event is expected.

* * * * *